(12) United States Patent
Wang et al.

(10) Patent No.: US 7,149,610 B2
(45) Date of Patent: Dec. 12, 2006

(54) MOMENTUM ESTIMATOR FOR ON-STATION MOMENTUM CONTROL

(75) Inventors: Hanching G. Wang, Hacienda Heights, CA (US); Rongsheng Li, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 350 days.

(21) Appl. No.: 10/647,958

(22) Filed: Aug. 26, 2003

(65) Prior Publication Data

US 2005/0049764 A1    Mar. 3, 2005

(51) Int. Cl.
*G05D 1/00* (2006.01)
*G05D 1/08* (2006.01)
*B64G 1/24* (2006.01)
*G06F 17/00* (2006.01)
*B64G 1/36* (2006.01)

(52) U.S. Cl. .................. 701/13; 701/3; 244/164; 244/171

(58) Field of Classification Search .............. 701/13, 701/4, 10; 244/158.1, 165, 166, 167, 168, 244/170, 171
See application file for complete search history.

(56) References Cited

U.S. PATENT DOCUMENTS

| 5,100,084 | A  | * | 3/1992  | Rahn et al. ................. 244/165 |
| 5,610,820 | A  | * | 3/1997  | Shankar et al. ............... 701/13 |
| 5,765,780 | A  | * | 6/1998  | Barskey et al. ............. 244/165 |
| 6,260,805 | B1 | * | 7/2001  | Yocum et al. .............. 244/164 |
| 6,293,501 | B1 | * | 9/2001  | Kurland ....................... 244/164 |
| 6,311,931 | B1 | * | 11/2001 | Smay ......................... 244/164 |
| 6,311,932 | B1 | * | 11/2001 | Rodden et al. ............. 244/165 |
| 6,471,161 | B1 | * | 10/2002 | D'Ambrosio et al. ....... 244/164 |
| 2003/0164429 | A1 | * | 9/2003 | McGovern et al. ......... 244/171 |
| 2004/0117074 | A1 | * | 6/2004 | Wang et al. ................. 701/13 |

* cited by examiner

*Primary Examiner*—Thomas Black
*Assistant Examiner*—Christine M. Behncke
(74) *Attorney, Agent, or Firm*—Gates & Cooper LLP

(57) ABSTRACT

A method and apparatus for estimating spacecraft momentum is disclosed. The method comprises the steps of generating a plurality of spacecraft momentum measurements, fitting the plurality of spacecraft momentum measurements to a parametric model of a spacecraft momentum profile having a time period of $t_p$, determining the momentum of the spacecraft from the parametric model; and generating an estimate of the momentum to be removed from the spacecraft at least in part from the determined momentum of the spacecraft.

45 Claims, 7 Drawing Sheets

MOMENTUM ESTIMATOR FOR ON-STATION MOMENTUM CONTROL

BACKGROUND OF THE INVENTION

1. Field of the Invention

The present invention relates to systems and methods for spacecraft navigation and control, and in particular to a system and method for determining spacecraft momentum and for dumping that momentum when necessary.

2. Description of the Related Art

Almost all Earth orbiting spacecraft utilize a set of reaction wheels to control attitude. A reaction wheel is a continuously spinning flywheel, mounted on a bearing. Most spacecraft use three reaction wheels to control attitude, with a fourth redundant wheel available in case of failure. As is the case with any spinning object, a force (or torque) can be created by altering the rotation rate of a reaction wheel. By carefully controlling the rotational speeds of the individual reaction wheels, the resulting torques can be combined to rotate the spacecraft to the desired orientation in space.

If a reaction wheel were to ever stop spinning, it would create an abrupt change in torque that would cause the spacecraft to jitter. This sudden jitter results in undesirable attitude errors. Therefore, reaction wheels are kept continuously spinning. The energy required to speed up and slow down the spinning reaction wheels can be collected from the Sun via the spacecraft's solar panels, or obtained from other sources.

Due to physical or material constraints, continuous-spin reaction wheel mechanisms are built to handle only up to a particular spin speed. After that speed is achieved, they can be accelerated no more. It is then necessary to "dump" the momentum built up in the reaction wheels. Typically, the spacecraft's momentum management software continuously makes adjustments to control momentum buildup.

Momentum can be dumped using thrusters, torquer bars, or similar devices. These devices create a torque external to the spacecraft opposing the wheel momentum direction to dump the wheel momentum. Momentum management software employs these devices to compensate for secular (non-periodic) momentum increases, allowing it to maintain reaction wheel spin rate within the designed operational range.

To determine when to dump momentum from the spacecraft and how much to dump, an estimate of the spacecraft's momentum must be made. Current estimators are torque-based in that they operate by estimating torque, then convert the estimated torque to equivalent momentum accumulation. This is accomplished by accumulating momentum changes (including that of the central body, reaction wheels, solar wings, and other appendages) over a period of about a minute. A backwards difference of momentum is taken over time as a measured torque, and used to update torque estimates. Torque is typically modeled as a Fourier series including a constant and two sinusoidal terms.

The torque estimate is separated into secular and cyclic estimates, typically in an earth centered inertial (ECI) reference frame. Secular momentum, which grows over time, is estimated and dumped on a periodic basis to avoid saturating the momentum wheels. The dumped momentum is a combination of the secular momentum estimate and the product of the secular torque estimate and one sidereal day. Typically, the momentum estimator is suspended when there is a thruster or engine firing, so that such control torques will not be mistaken as environmental torques.

Unfortunately, since environmental torques are not sinusoidal when transitioning to the eclipse (when the satellite enters and leaves the Earth's shadow), the use of a second order Fourier series does not provide sufficient accuracy to approximate the environmental torque, and inaccurate torque estimates provide inaccurate momentum dumping.

Also, the process of backwards differencing momentum over time to arrive at a measured torque is inherently noisy, and can result in substantial noise amplification. This noise amplification makes it difficult for a torque estimate to converge. Further, the foregoing technique is characterized by a long time constant and large phase large that results in a low stability margin in the momentum dumping control loop.

The foregoing techniques fail to use a momentum repeatable period of a solar day, as the torque estimator is designed to be repeatable in a sidereal day to accommodate satellite stationkeeping. This results in a momentum walking of four minutes per day, and further degrades performance. The foregoing estimation technique also dumps small quantities of momentum when it might be tolerable to save such small quantities for the next scheduled momentum dump. Further, the estimator sampling/updating period cannot be adjusted on orbit.

What is needed is a method and apparatus for estimating spacecraft momentum and for dumping excessive momentum without the foregoing disadvantages. The present invention satisfies this need.

SUMMARY OF THE INVENTION

To address the requirements described above, the present invention discloses a method and apparatus for estimating spacecraft momentum and for dumping excessive momentum. The method comprises the steps of generating a plurality of spacecraft momentum measurements; fitting the plurality of spacecraft momentum measurements to a parametric model of a spacecraft momentum profile having a time period of $t_p$; determining the momentum of the spacecraft from the parametric model; and generating an estimate of the momentum to be removed from the spacecraft at least in part from the determined momentum of the spacecraft.

The apparatus comprises a first module for accepting a plurality of spacecraft momentum measurements and for fitting the plurality of spacecraft momentum measurements to a parametric model of a spacecraft momentum profile having a time period of $t_p$; a second module for determining the momentum of the spacecraft from the parametric model; and a third module for generating an estimate of the momentum to be removed from the spacecraft at least in part from the determined momentum of the spacecraft. The first, second, and third modules may be software modules comprising instructions performed by one or more processors, or hardware modules comprising circuit elements for performing the indicated operations.

The present invention uses momentum measurements to estimate the momentum directly, without backwards differencing and the resulting noise amplification.

The present invention permits the momentum profile for the previous solar day to be embedded in flight software. This is accomplished by dividing the day into segments and curve fitting the momentum for each segment (e.g. to a third order polynomial). Only the coefficients of the polynomial need be stored to reconstruct the momentum profile.

The present invention provides a representation accuracy in the order of milli-newton-meter-seconds, and an estimator time constant in the order of minutes, which enhances the stability of the momentum estimating/dumping control loop. Noise is filtered down, instead of amplified by backwards-differencing.

Although the momentum repeatable period is a solar day, the momentum profile is accurately represented, and the momentum dump command can be computed every sidereal day to accommodate stationkeeping needs without a four minute momentum walking effect. The present invention need not be disabled during thruster or engine firing, and thus, can be implemented with simpler control logic as well.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, byway of illustration, several embodiments of the present invention. It is understood that other embodiments may be utilized and structural changes may be made without departing from the scope of the present invention.

Figure 1:
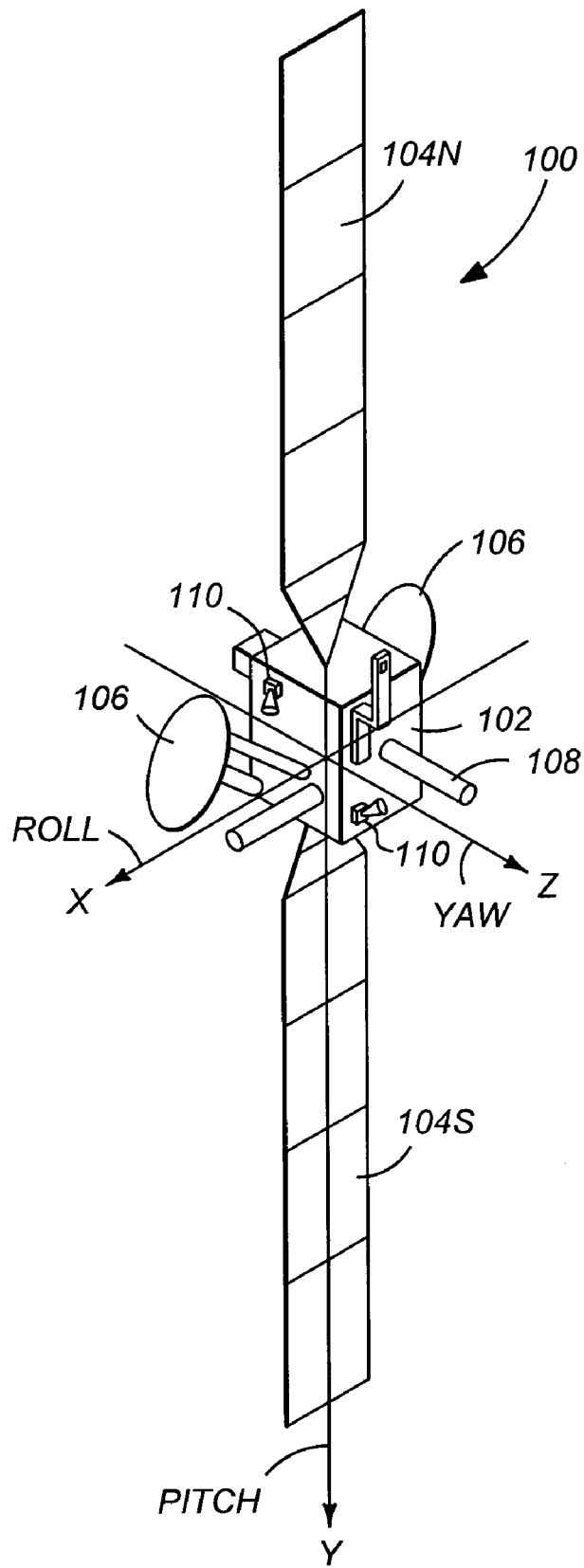
FIG. 1 is a diagram illustrating a spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Z.

Figure 2:
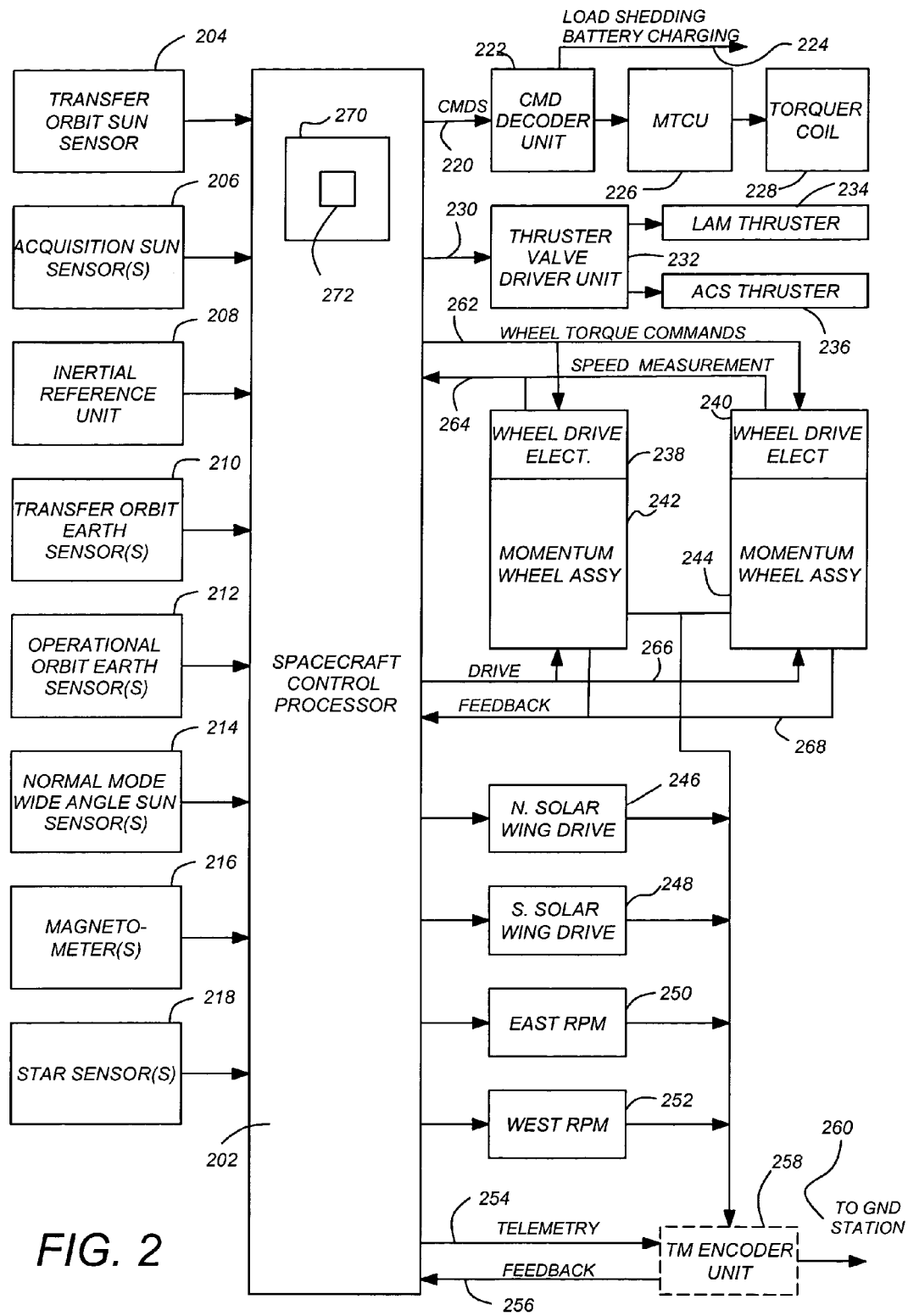
FIG. 2 is a diagram depicting the functional architecture of a representative attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 10 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
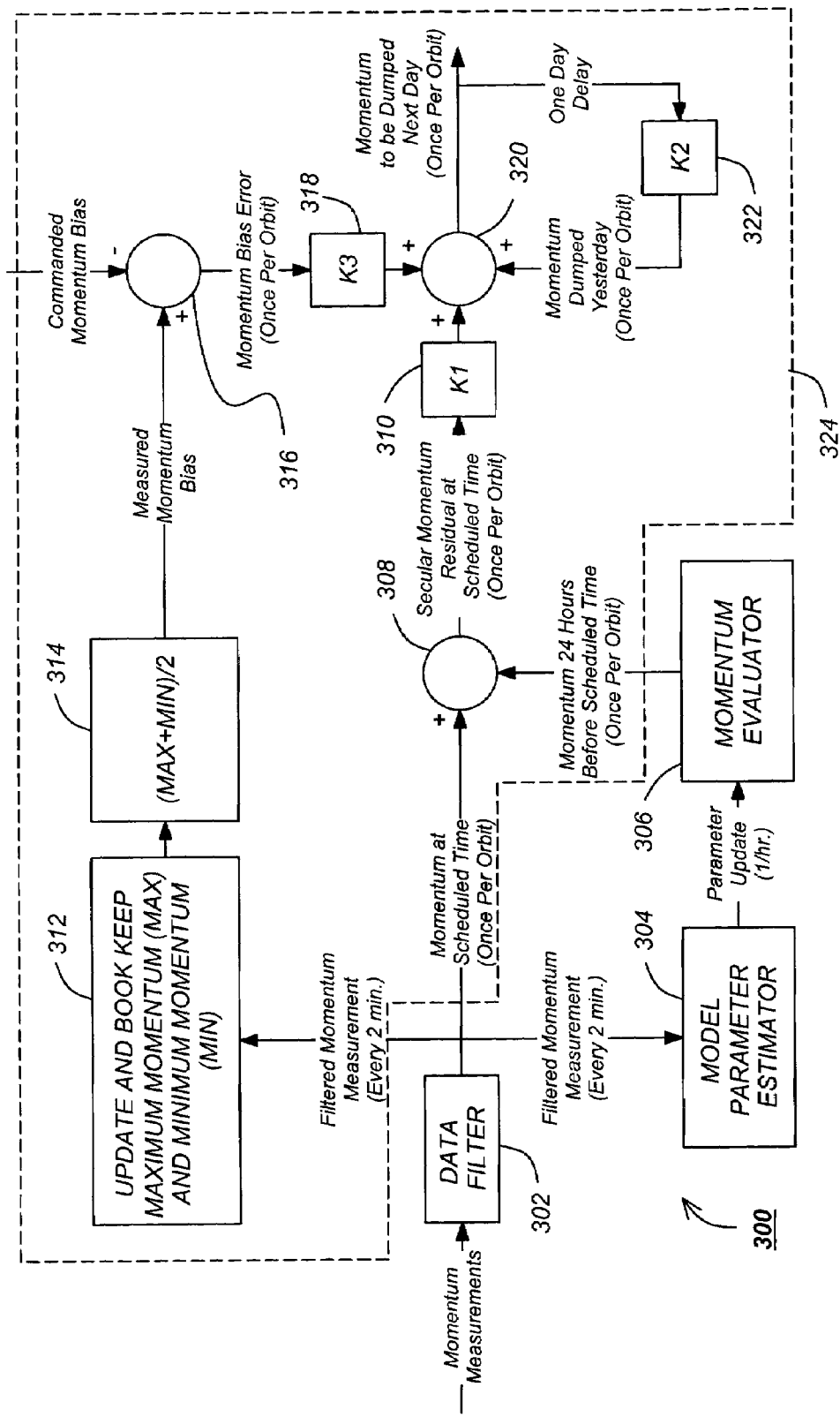
FIG. 3 is a diagram illustrating a momentum dumping control subsystem.

FIG. 3 is a diagram illustrating a momentum dumping control subsystem (MDCS) 300. The MDCS comprises a data filter 302, model-parameter estimator 304, a momentum evaluator 306, and a momentum scheduler 324.

Momentum measurements are provided to the data filter 302. Momentum measurements can be determined as a sum the momentum of the spacecraft 100 and the momentum/reaction wheels. The momentum of the spacecraft 100 can be determined from the product of the known or estimated inertia of the spacecraft and it's angular velocity. The momentum of each of the momentum/reaction wheels can be determined from the known inertia of each of the momentum/reaction wheels and their angular velocity.

The data filter 302 filters the raw momentum measurements. Typically, the momentum measurements derived from gyro and wheel speed measurements are available at relatively high frequencies (7–8 Hz). However, the spacecraft momentum changes due to environmental torques is much slower, typically lower than 2 newton-meter-seconds per minute. The data filter 302 filters higher frequency components that are not of interest, and permit the remaining elements of the MDCS to process information at a lower rate. The data filter 302 therefore aggregates data from a high sampling frequency to a low sampling frequency, and anti-aliases the data so that the data can be subsequently processed at a low sampling frequency. The data filter 302 can comprise a low pass filter, a running average filter, or as depicted in FIG. 3, a filter which sums the momentum measurements and periodically dumps the sum divided by the number of measurements (a "sum and dump" or average-down filter).

The filtered momentum measurements are provided to the model parameter estimator 304. The model parameter estimator 304 generates parameter updates which are provided to the momentum evaluator 306. In one embodiment, the model parameter estimator 304 uses a uniform, segmented, piece-wise continuous momentum profile model. In this embodiment, the momentum profile over a time period $t_p$ (e.g. a solar day) is separated into segments, with each segment modeled by a polynomial or Fourier series or other basis function. In the implementation shown in FIG. 3, the model comprises N=24 segments, each of the segments one hour in duration and modeled by a third order polynomial. Since filtered measurements are provided every two minutes, the parameters of each segment are determined by the estimator by use of m=30 data points.

In another embodiment, the profile over the entire solar day may be represented by a single segment (e.g. N=1). In this case, a higher-order model (e.g. a $10^{th}$ order Fourier series) may be used to represent the momentum profile over the duration of the solar day. The underlying model for each of the segments may be the same as the model for other segments (differing only in the value of the coefficients), or maybe a model of a different type or order.

These models are effective because momentum changes occur primarily because of environmental torques and thruster firings. Momentum changes due to environmental torques are repeatable (or periodic) in a solar day.

This technique is computationally efficient, because the segmentation can be pre-determined, leaving only model parameters to be estimated using algorithms that are also pre-determined. The most computationally intensive portions of the model parameter estimation can be accomplished in advance.

Figure 4:
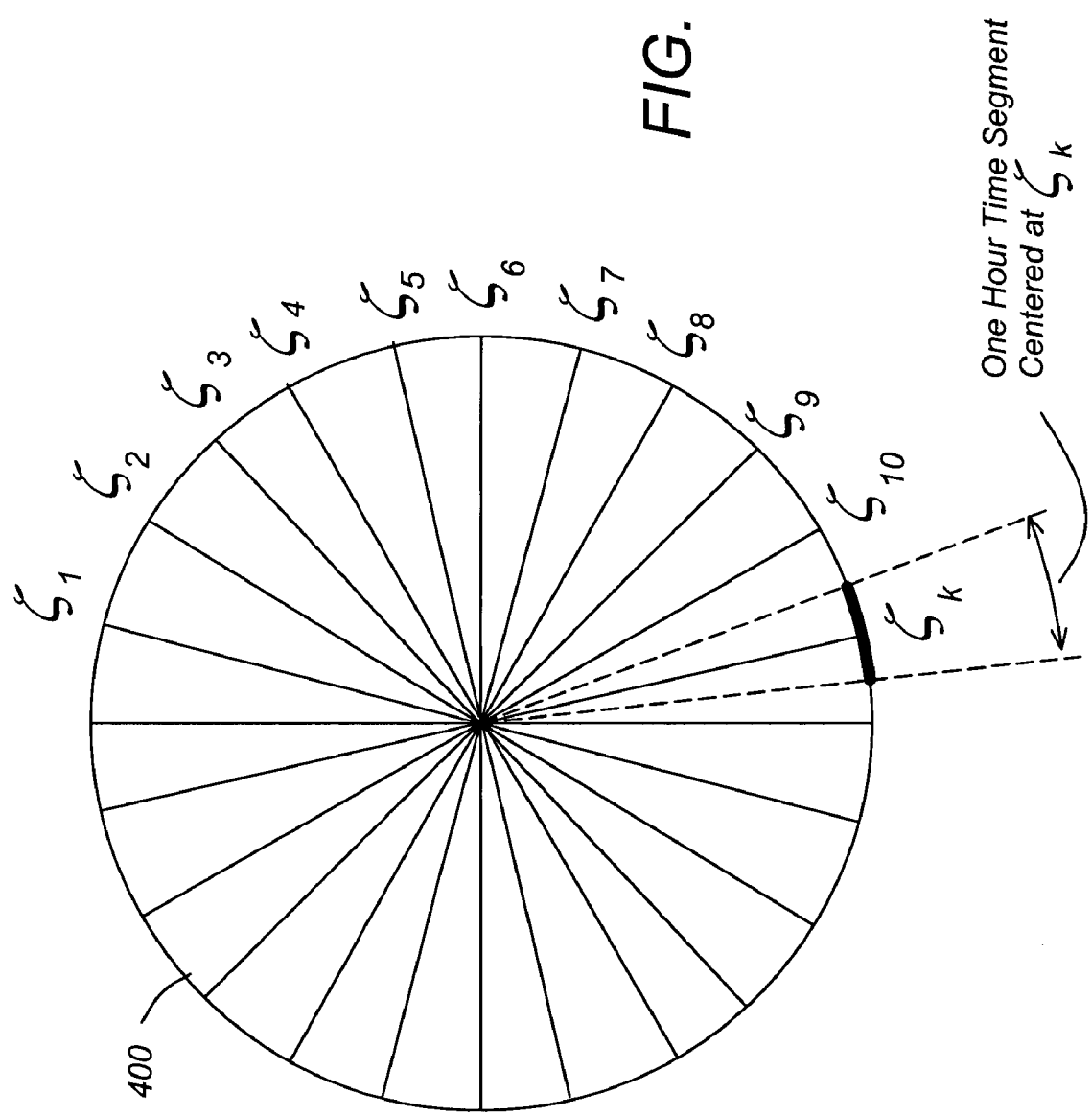
FIG. 4 is a diagram illustrating an example of a segmented momentum model.

FIG. 4 is a diagram illustrating an example of a segmented momentum model. N pre-assigned, equally spaced "center points" $\zeta_1, \zeta_2, \ldots, \zeta_N$ of the orbit 400 in time or in true anomaly, are identified over the entire orbit or over the eclipse region of the orbit (the period when the spacecraft 100 is shaded from the Sun by the Earth). In the illustrated embodiment, the entire orbit is separated into N=24 segments, each having a duration of an hour.

In one embodiment, the momentum for each segment can be represented by equation (1) below:

$$M_k(\zeta) = \sum_i a_{k,i} \phi_i(\zeta - \zeta_k) \qquad \text{Eq. (1)}$$

where $\zeta$ is a variable that can be used to determine the spacecraft 100 location in the orbit 700, $\zeta_k$ is the value of the variable at the center of segment k, $\phi_i(\bullet)$ describes a set of base functions, and $a_{k,i}$ are parameters to be estimated (e.g. by a least square curve fit). Examples of the variable $\zeta$ include the spacecraft 100 local time, true anomaly, or mean anomaly. Examples of the function set $\phi_i(\bullet)$ include polynomial power functions, sine/cosine functions or a Fourier series.

For example, the polynomial may be a third order polynomial such as described in equation (2) below:

$$M_k = a_{k0} + a_{k1}(\zeta - \zeta_k) + a_{k2}(\zeta - \zeta_k)^2 + a_{k3}(\zeta - \zeta_k)^3 \qquad \text{Eq. (2)}$$

For each segment centered around the center point of the segment, there are m measurements, j=1, 2, . . . , m:

$$\zeta(j) = (\zeta_k(j) - \zeta_k) \in \left[ -\frac{\Delta \zeta}{2}, \frac{\Delta \zeta}{2} \right], \qquad \text{Eq. (3)}$$

thus yielding the following equations:

$$M_k(j) = a_{k0} + a_{k1}\zeta(j) + a_{k2}\zeta(j)^2 + a_{k3}\zeta(j)^3 \qquad \text{Eq. (4)}$$

$$= [1 \; \zeta(j) \; \zeta(j)^2 \; \zeta(j)^3] \begin{bmatrix} a_{k0} \\ a_{k1} \\ a_{k2} \\ a_{k3} \end{bmatrix}$$

$$= h^T(\zeta(j))A_k$$

$$Y_k = \begin{bmatrix} \vdots \\ M_k(j) \\ \vdots \end{bmatrix} = \begin{bmatrix} \vdots \\ h^T(\zeta(j)) \\ \vdots \end{bmatrix} A_k = HA_k \qquad \text{Eq. (5)}$$

The linear algebraic Eq. (5) is over-determined, therefore the model parameters can be solved by least square pseudo inverse:

$$\hat{A} = H^+ Y_k = pinv(H) Y_k \qquad \text{Eq. (6)}$$

wherein $Y_k$ represents the "m" momentum measurements in the segment.

For each segment, for example, a number of measurements over that segment are used to compute a fit to a third order polynomial by solving equation (6) for $\hat{A}$, the coefficients of the third order polynomial. In solving equation (6) for $\hat{A}$, it is worthwhile to note that pinv(H), the puesdo inverse of H, is a constant matrix (not a function of the measurement data) that can be pre-determined when the spacecraft 100 is designed. If desired, pinv(H) can be implemented in a programmable read only memory (PROM), or in a random access memory (RAM) that can be updatable from the ground. It is also noteworthy that $\hat{A}$ computation can be made recursive.

Figure 5:
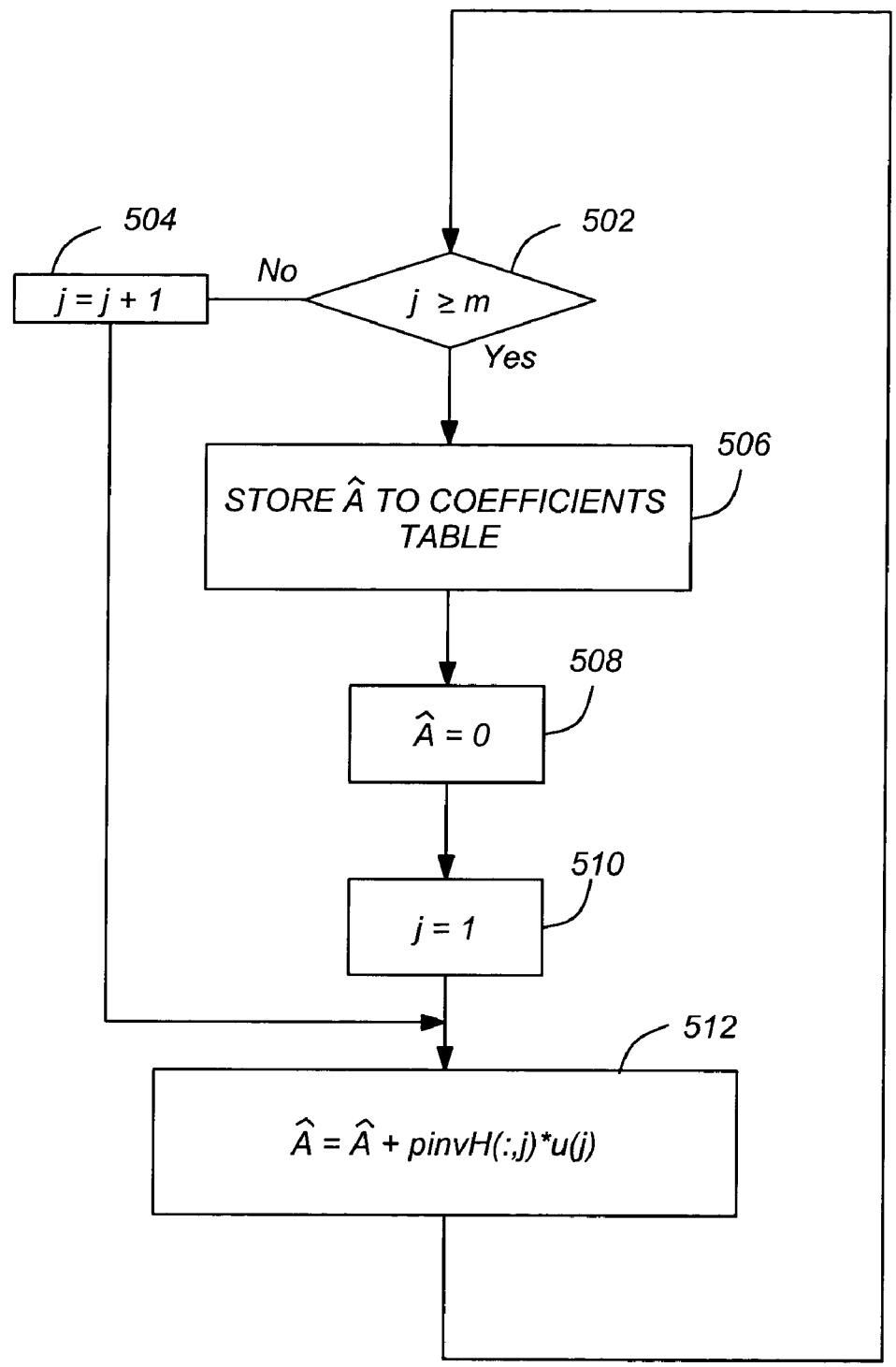
FIG. 5 is a flow chart showing how the computation of $\hat{A}$ can be implemented in recursive form.

FIG. 5 is a flow chart showing how the computation of $\hat{A}$ can be implemented in recursive form. Block 502 determines if a new time segment has started by checking if a counter j is greater than or equal to m. If not, the counter is incremented, and processing returns to block 502. If the counter j equals or exceeds m, the values of $\hat{A}$ (representing the polynomial coefficients) is stored in a table, as shown in block 506. Next, the values of $\hat{A}$ are set to zero, and the counter j is set to "1", as shown in blocks 508 and 510. Then, the value of $\hat{A}$ is determined from the relationship described in equation (7) below, as shown in block 512.

$$\hat{A} = \hat{A} + pinvH(:,j) \cdot u(j) \qquad \text{Eq. (7)}$$

If the data made available by the filter 302 is provided every two minutes, the curve fit will use m=30 data points. Matrix inversions required to compute the coefficients can be pre-computed, and the remaining curve-fit computations can be completed with reduced processing and storage requirements. For example, in the above case, the memory requirement for the pinv(H) matrix is 120 elements, and the same matrix can be used for normal (non-eclipse) and eclipse mode types, and with the roll and pitch channels. Regarding the coefficients table described above, the storage of one table for roll and one table for pitch for the normal mode type for 24 hours requires a total of 96 elements.

The model parameter estimator 304 provides updated parameters to the momentum evaluator 306. At the time scheduled by the scheduler 324 (e.g. at the center of segment k, period j, he momentum model evaluator 306 predicts the total momentum of the spacecraft 100 using the model $$M_k(\zeta) = \sum_i a_{k,i} \phi_i(\zeta - \zeta_k)$$

wherein $\zeta_k$ is the time-center of the segment k, $\phi_i(\bullet)$ are the power series of the third order polynomial, and $a_{k,i}$ are parameters identified/estimated by least square curve fitting performed by the model parameter estimator 304. In the illustrated embodiment, the parameters are updated every hour (corresponding to a segment).

The momentum dumping is typically computed and performed on a periodic basis. For spacecraft 100 using bipropellant momentum dumping, the momentum dump can be computed once every solar day, while for spacecraft 100 in which station keeping is performed periodically with the sidereal day, the momentum is computed and dumped every sidereal day.

At the end of each data filtering period and before any parameter updates, a determination is made regarding whether the scheduled momentum dumping command is within a specific time window. In one embodiment, each time window is the same duration as the data filtering period (e.g. two minutes in the system depicted in FIG. 3). This ensures that the dumping command is computed and the momentum dump is performed once per orbit. If the momentum dumping command falls within the window, a momentum dumping command is computed.

Returning to FIG. 3, the data filter 302 provides momentum measurements to a differencer 308, which determines the secular momentum residual. This is determined as a difference between the currently measured momentum for segment k and period j and the evaluated momentum for segment k period j of previous solar day from the momentum evaluator 306. This produces a difference between the measured spacecraft momentum at the time scheduled for momentum dumping (typically once per orbit) and the estimated momentum 24 hours before the time scheduled for the momentum dump. The two time values differ by exactly a solar day, the repeatable period of the momentum accumulation from environmental sources, hence, the difference is an estimate of the secular (rather than the cyclic) momentum residual, which should be dumped periodically (e.g. once per orbit). The estimate of the secular momentum is multiplied by gain K1 310.

The scheduler 324 also generates an estimate of measured momentum bias. This is illustrated in elements 312 and 314. Filtered momentum measurements are provided to block 312, which stores the maximum and minimum momentum measurements over one solar day. The maximum and minimum momentum measurements are divided by two by block 314 to determine the measured momentum bias. Since a particular value for momentum bias may have been commanded (typically zero for zero momentum bias spacecraft), the commanded momentum bias is subtracted from the measured momentum bias by differencer 316. This difference provides the momentum bias error, which is multiplied by gain K3 318.

The momentum dumped during the previous momentum dump period (in this embodiment, one solar day) is multiplied by a gain K2 322. Therefore, the momentum to be dumped becomes:

$$M_{command} = (K1 \times M_{secular\_residual}) + (K2 \times M_{yesterday's\_dump}) + (K3 \times M_{bias\_error})$$  Eq. (8)

In a perfect steady state operation with both secular momentum residual and momentum bias error equal zero, the current day needs to dump the same amount as the previous solar day. The additional term of secular momentum residual compensates for day-to-day variation of secular momentum. The additional term of momentum bias error compensates for day-to-day drift of commanded momentum bias. Exemplary gains for K1, K2, and K3 are 1.0, 0.5 and 0.5, respectively. Other exemplary gain values for K1, K2, and K3 are 0.5, 1.0, 0.5, respectively. In one embodiment, if the computed momentum does not exceed a desired deadband amount, the command is disregarded (essentially deadbanding the command before providing it to the satellite attitude control system). Further, the computed momentum can be limited to a upper bound of the momentum dumping capability of the satellite 100 before providing the command to the satellite control system and actually performing the momentum dump.

Figure 6:
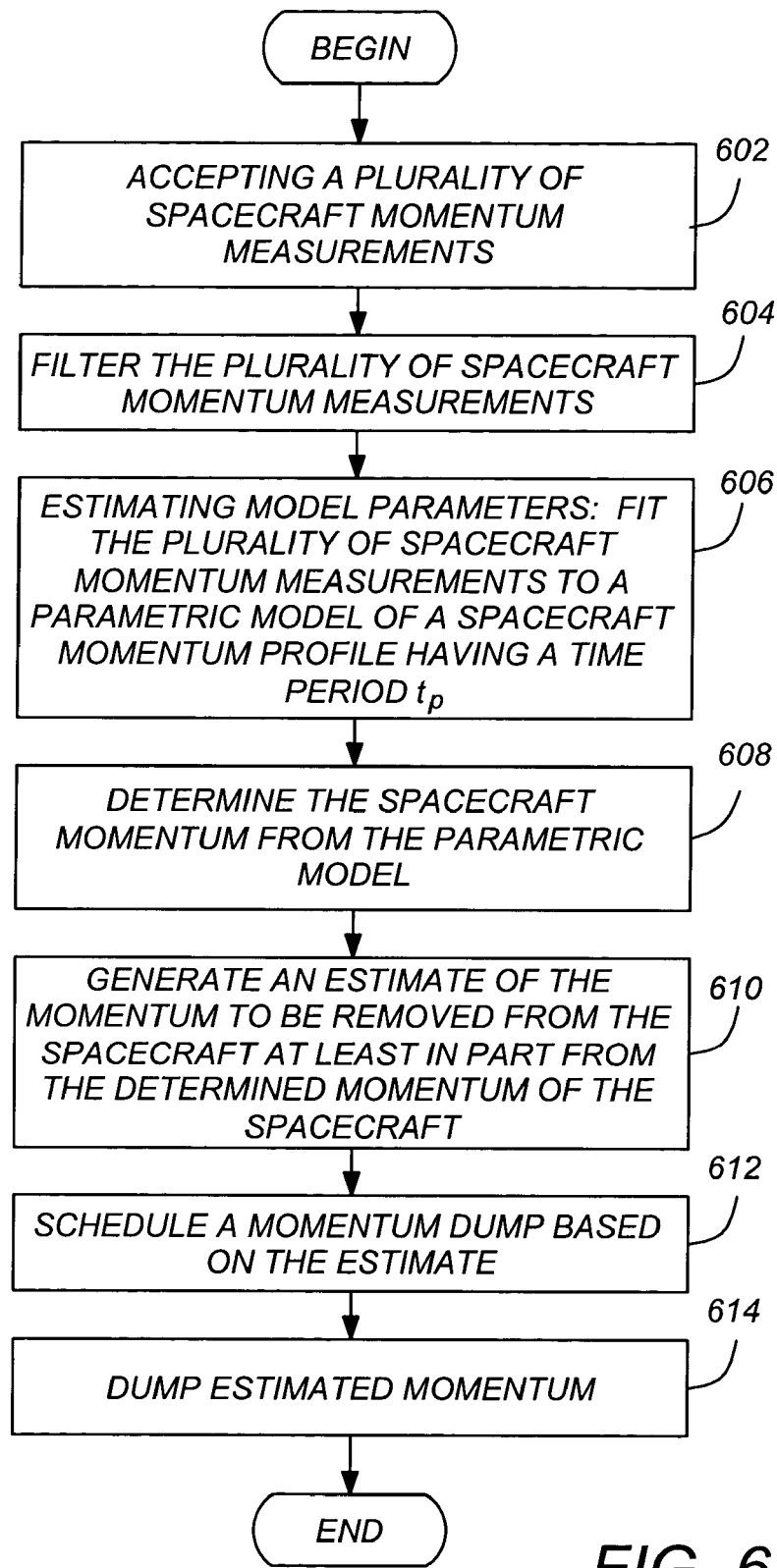
FIG. 6 is a flow chart illustrating exemplary process steps that can be used to practice one embodiment of the present invention.

FIG. 6 is a flow chart illustrating exemplary process steps that can be used to practice one embodiment of the present invention. A plurality of spacecraft momentum measurements are generated and accepted as shown in block 602.

Figure 7:
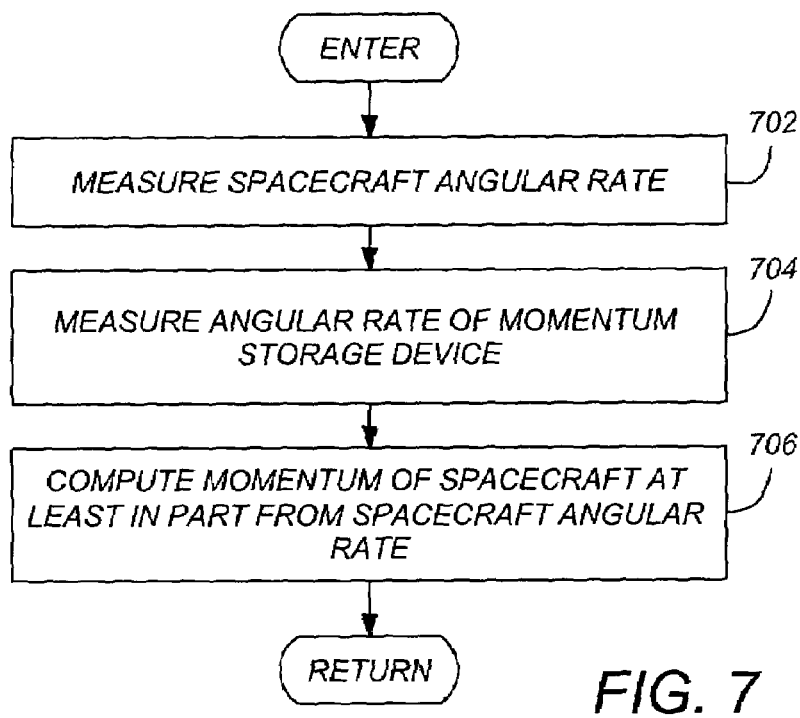
FIG. 7 is a flow chart illustrating one method of generating spacecraft momentum measurements.

FIG. 7 is a flow chart illustrating one method of generating spacecraft momentum measurements. The angular rate of the spacecraft 100 is measured, as shown in block 702. This can be accomplished with gyroscopes in the inertial reference unit 208 or with any of the other sensors shown in FIG. 2. An angular rate of the momentum storage device is measured, as shown in block 704. The momentum of the spacecraft can then be determined from the angular rate and known or estimated inertia of the spacecraft and the momentum wheels, as shown in FIG. 7.

Returning to FIG. 6, the plurality of spacecraft momentum measurements can be filtered using a filter such as data filter 302 illustrated in FIG. 3. The plurality of spacecraft momentum measurements (optionally filtered) are then fit to a parametric model of a spacecraft momentum profile (spacecraft momentum over time) having a time period $t_p$, as shown in block 606. In one embodiment, this is performed by the model parameter estimator 304. An estimate of the spacecraft momentum is then determined from the parametric model, as shown in block 608. This maybe accomplished, for example, by the momentum evaluator 306. An estimate of the momentum to be removed from the spacecraft 100 is then generated at least in part from the estimate of the spacecraft 100 momentum, as shown in block 610.

Figure 8:
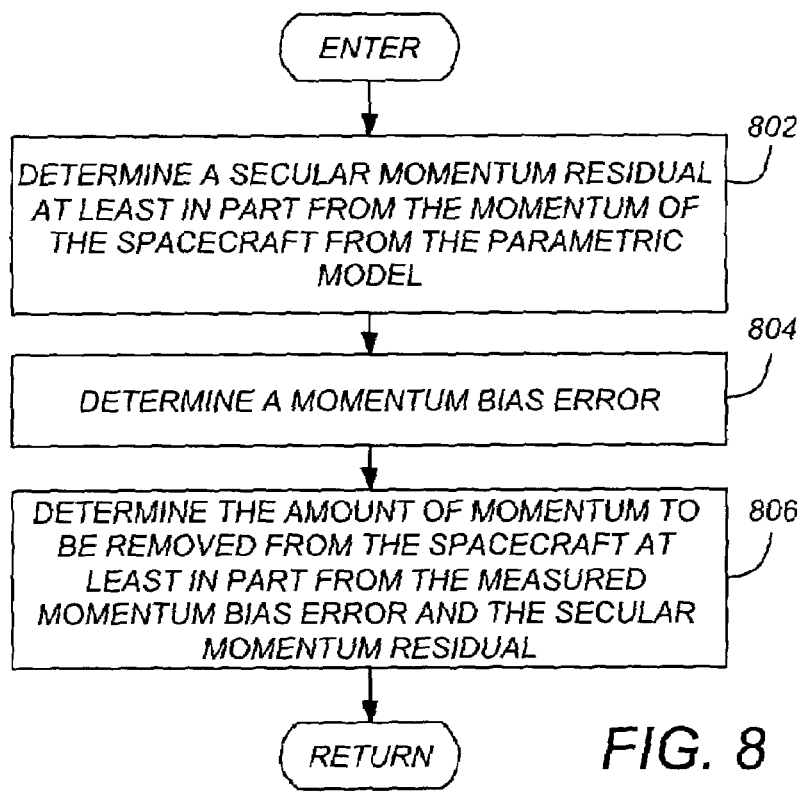
FIG. 8 is a diagram showing exemplary operations that can be used to generate the estimate of the momentum to be removed from the spacecraft.

FIG. 8 is a diagram showing exemplary operations that can be used to generate the estimate of the momentum to be removed from the spacecraft 100. A secular momentum residual is generated at least in part from the momentum of the spacecraft determined from the parametric model, as shown in block 802. A momentum bias error is determined, and these two factors are used to determine the amount of momentum to be removed from the spacecraft, as shown in blocks 804 and 806.

The operations shown in FIGS. 3 and 6–8 can be performed by one or more dedicated or hybrid electronic circuits, or can be performed by one or more processors such as SCP 202 or a ground-based processor, in accordance with processor instructions organized into one or more software modules stored in one or more memories, including memory 270.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of estimating a momentum to be removed from a spacecraft:
   generating a plurality of spacecraft momentum measurements;
   fitting the plurality of spacecraft momentum measurements to a parametric model of a spacecraft momentum profile having a time period of $t_p$;
   determining the momentum of the spacecraft from the parametric model; and
   generating an estimate of the momentum to be removed from the spacecraft at least in part from the determined momentum of the spacecraft;
   wherein the generating a plurality of spacecraft momentum measurements comprises
      measuring the spacecraft angular rate;
      measuring an angular rate of a momentum storage device disposed in the satellite; and
      computing the momentum of the spacecraft at least in part from the spacecraft angular rate, the momentum storage device angular rate, and an inertia of the spacecraft and an inertia of the momentum storage device; and
   wherein the period spacecraft momentum profile comprises a plurality of segments, each segment modeled by a set of basis functions selected from the group comprising a $3^{rd}$ order polynomial, and each segment is an hour in duration.

2. The method of claim 1, further comprising the step of filtering the plurality of spacecraft momentum measurements before fitting the spacecraft momentum measurements to the parametric model.

3. The method of claim 1, wherein the step of estimating the amount of momentum to be removed from the spacecraft comprises the steps of:
   determining a secular momentum residual at least in part from the momentum of the spacecraft determined from the parametric model;
   determining a momentum bias error; and
   determining the amount of momentum to be removed from the spacecraft at least in part from the measured momentum bias error and the secular momentum residual.

4. The method of claim 3, wherein the step of determining a secular momentum residual at least in part from the momentum of the spacecraft comprises the steps of:

filtering the spacecraft momentum measurements; and determining a difference between a spacecraft momentum measurement at a scheduled time for removing the momentum from the spacecraft and the estimate of the spacecraft momentum at a time one time period $t_p$ prior to the scheduled time for removing the momentum from the spacecraft.

5. The method of claim 4, wherein the step of determining a momentum bias error comprises the steps of:

determining the measured momentum bias at least in part from $$\frac{M_{MAX} + M_{MIN}}{2},$$

wherein $M_{MAX}$ is the maximum momentum observed during the time period $t_p$ and $M_{MIN}$ is a minimum momentum observed during the time period $t_p$; and determining the momentum bias error as a difference between the measured momentum bias and a commanded momentum bias.

6. The method of claim 5, wherein spacecraft momentum is at least partially periodic with time period $t_p$.

7. An apparatus for estimating a momentum to be removed from a spacecraft:

means for generating a plurality of spacecraft momentum measurements;

means for fitting the plurality of spacecraft momentum measurements to a parametric model of a spacecraft momentum profile having a time period of $t_p$;

means for determining the momentum of the spacecraft from the parametric model; and means for generating an estimate of the momentum to be removed from the spacecraft at least in part from the determined momentum of the spacecraft;

wherein the spacecraft comprises a momentum storage device, and wherein the means for generating a plurality of spacecraft momentum measurements comprises means for measuring the spacecraft angular rate;

means for measuring an angular rate of a momentum storage device disposed in the satellite; and means for computing the momentum of the spacecraft at least in part from the spacecraft angular rate, the momentum storage device angular rate, and an inertia of the spacecraft and an inertia of the momentum storage device; and wherein the period spacecraft momentum profile comprises a plurality of segments, each segment modeled by a set of basis functions selected from the group comprising a $3^{rd}$ order, polynomial, and each segment is an hour in duration.

8. The apparatus of claim 7, further comprising means for filtering the plurality of spacecraft momentum measurements before fitting the spacecraft momentum measurements to the parametric model.

9. The apparatus of claim 7, wherein the means for estimating the amount of momentum to be removed from the spacecraft comprises:

means for determining a secular momentum residual at least in part from the momentum of the spacecraft determined from the parametric model;

means for determining a momentum bias error; and means for determining the amount of momentum to be removed from the spacecraft at least in part from the measured momentum bias error and the secular momentum residual.

10. The apparatus of claim 9, wherein the means for determining a secular momentum residual at least in part from the momentum of the spacecraft comprises:

means for filtering the spacecraft momentum measurements; and means for determining a difference between a spacecraft momentum measurement at a scheduled time for removing the momentum from the spacecraft and the estimate of the spacecraft momentum at a time one time period $t_p$ prior to the scheduled time for removing the momentum from the spacecraft.

11. The apparatus of claim 10, wherein the means for determining a momentum bias error comprises;

means for determining the measured momentum bias at least in part from $$\frac{M_{MAX} + M_{MIN}}{2},$$

wherein $M_{MAX}$ is the maximum momentum observed during the time period $t_p$ and $M_{MIN}$ is a minimum momentum observed during the time period $t_p$; and means for determining the momentum bias error as a difference between the measured momentum bias and a commanded momentum bias.

12. The apparatus of claim 11, wherein spacecraft momentum is at least partially periodic with time period $t_p$.

13. An apparatus for estimating a momentum to be removed from a spacecraft:

a first module for accepting a plurality of spacecraft momentum measurements and for fitting the plurality of spacecraft momentum measurements to a parametric model of a spacecraft momentum profile having a time period of $t_p$;

a second module for determining the momentum of the spacecraft from the parametric model;

a third module for generating an estimate of the momentum to be removed from the spacecraft at least in part from the determined momentum of the spacecraft; and a filter for filtering the plurality of spacecraft momentum measurements before fitting the spacecraft momentum measurements to the parametric model; and wherein the period spacecraft momentum profile comprises a plurality of segments, each segment modeled by a set of basis functions selected from the group comprising a $3^{rd}$ order polynomial, and each segment is an hour in duration.

14. The apparatus of claim 13, further comprising a processor, and wherein the first module, the second module, and the third module are software modules comprising instructions performable by the processor.

15. The apparatus of claim 13, wherein the third module comprises:

a fourth module for determining a secular momentum residual at least in part from the momentum of the spacecraft determined from the parametric model;

a fifth module for determining a momentum bias error; and a sixth module for determining the amount of momentum to be removed from the spacecraft at least in part from the measured momentum bias error and the secular momentum residual.

16. The apparatus of claim 15, wherein:
the apparatus further comprises a filter for filtering the spacecraft momentum measurements; and
the fourth module comprises a differencer for determining a difference between a spacecraft momentum measurement at a scheduled time for removing the momentum from the spacecraft and the estimate of the spacecraft momentum at a time one time period $t_p$ prior to the scheduled time for removing the momentum from the spacecraft.

17. The apparatus of claim 15, wherein the fifth module comprises:
a seventh module for determining the measured momentum bias at least in part from $$\frac{M_{MAX} + M_{MIN}}{2},$$

wherein $M_{MAX}$ is the maximum momentum observed during the time period $t_p$ and $M_{MIN}$ is a minimum momentum observed during the time period $t_p$; and
an eighth module for determining the momentum bias error as a difference between the measured momentum bias and a commanded momentum bias.

18. The apparatus of claim 17, wherein spacecraft momentum is at least partially periodic with time period $t_p$.

19. A method of estimating a momentum to be removed from a spacecraft:
generating a plurality of spacecraft momentum measurements;
fitting the plurality of spacecraft momentum measurements to a parametric model of a spacecraft momentum profile having a time period of $t_p$;
determining the momentum of the spacecraft from the parametric model; and
generating an estimate of the momentum to be removed from the spacecraft at least in part from the determined momentum of the spacecraft;
wherein the step of estimating the amount of momentum to be removed from the spacecraft comprises the steps of:
determining a secular momentum residual at least in part from the momentum of the spacecraft determined from the parametric model;
determining a momentum bias error; and
determining the amount of momentum to be removed from the spacecraft at least in part from the measured momentum bias error and the secular momentum residual.

20. The method of claim 19, wherein the step of determining a secular momentum residual at least in part from the momentum of the spacecraft comprises the steps of:
filtering the spacecraft momentum measurements; and
determining a difference between a spacecraft momentum measurement at a scheduled time for removing the momentum from the spacecraft and the estimate of the spacecraft momentum at a time one time period $t_p$ prior to the scheduled time for removing the momentum from the spacecraft.

21. The method of claim 20, wherein the step of determining a momentum bias error comprises the steps of:
determining the measured momentum bias at least in part from $$\frac{M_{MAX} + M_{MIN}}{2},$$

wherein $M_{MAX}$ is the maximum momentum observed during the time period $t_p$ and $M_{MIN}$ is a minimum momentum observed during the time period $t_p$; and
determining the momentum bias error as a difference between the measured momentum bias and a commanded momentum bias.

22. The method of claim 21, wherein spacecraft momentum is at least partially periodic with time period $t_p$.

23. The method of claim 19, wherein the spacecraft comprises a momentum storage device, and wherein the step of generating a plurality of spacecraft momentum measurements comprises the steps of:
measuring the spacecraft angular rate;
measuring an angular rate of a momentum storage device disposed in the satellite; and
computing the momentum of the spacecraft at least in part from the spacecraft angular rate, the momentum storage device angular rate, and an inertia of the spacecraft and an inertia of the momentum storage device.

24. The method of claim 19, further comprising the step of filtering the plurality of spacecraft momentum measurements before fitting the spacecraft momentum measurements to the parametric model.

25. The method of claim 19, wherein the periodic spacecraft momentum profile comprises a plurality of segments, each segment modeled by a set of basis functions.

26. The method of claim 25, wherein the set of basis functions is selected from the group comprising:
a polynomial; and
a Fourier series.

27. The method of claim 26, wherein the set of basis functions is a $3^{rd}$ order polynomial, and each segment is one hour in duration.

28. An apparatus for estimating a momentum to be removed from a spacecraft:
means for generating a plurality of spacecraft momentum measurements;
means for fitting the plurality of spacecraft momentum measurements to a parametric model of a spacecraft momentum profile having a time period of $t_p$;
means for determining the momentum of the spacecraft from the parametric model; and
means for generating an estimate of the momentum to be removed from the spacecraft at least in part from the determined momentum of the spacecraft;
wherein the means for estimating the amount of momentum to be removed from the spacecraft comprises:
means for determining a secular momentum residual at least in part from the momentum of the spacecraft determined from the parametric model;
means for determining a momentum bias error; and
means for determining the amount of momentum to be removed from the spacecraft at least in part from the measured momentum bias error and the secular momentum residual.

29. The apparatus of claim 28, wherein the means for determining a secular momentum residual at least in part from the momentum of the spacecraft comprising:

means for filtering the spacecraft momentum measurements; and means for determining a difference between a spacecraft momentum measurement at a scheduled time for removing the momentum from the spacecraft and the estimate of the spacecraft momentum at a time one time period $t_p$ prior to the scheduled time for removing the momentum from the spacecraft.

30. The apparatus of claim 29, wherein the means for determining a momentum bias error comprises:

means for determining the measured momentum bias at least in part from $$\frac{M_{MAX} + M_{MIN}}{2},$$

wherein $M_{MAX}$ is the maximum momentum observed during the time period $t_p$ and $M_{MIN}$ is a minimum momentum observed during the time period $t_p$; and means for determining the momentum bias error as a difference between the measured momentum bias and a commanded momentum bias.

31. The apparatus of claim 30, wherein spacecraft momentum is at least partially periodic with time period $t_p$.

32. The apparatus of claim 28, wherein the spacecraft comprises a momentum storage device, and wherein the means for generating a plurality of spacecraft momentum measurements comprises:

means for measuring the spacecraft angular rate;

means for measuring an angular rate of a momentum storage device disposed in the satellite; and means for computing the momentum of the spacecraft at least in part from the spacecraft angular rate, the momentum storage device angular rate, and an inertia of the spacecraft and an inertia of the momentum storage device.

33. The apparatus of claim 28, further comprising means for filtering the plurality of spacecraft momentum measurements before fitting the spacecraft momentum measurements to the parametric model.

34. The apparatus of claim 28, wherein the periodic spacecraft momentum profile comprises a plurality of segments, each segment modeled by a set of basis functions.

35. The apparatus of claim 34, wherein the set of basis functions is selected from the group comprising:

a polynomial; and a Fourier series.

36. The apparatus of claim 35, wherein the set of basis functions is a $3^{rd}$ order polynomial, and each segment is one hour in duration.

37. An apparatus for estimating a momentum to be removed from a spacecraft:

a first module for accepting a plurality of spacecraft momentum measurements and for fitting the plurality of spacecraft momentum measurements to a parametric model of a spacecraft momentum profile having a time period of $t_p$;

a second module for determining the momentum of the spacecraft from the parametric model; and a third module for generating an estimate of the momentum to be removed from the spacecraft at least in part from the determined momentum of the spacecraft;

wherein the third module comprises:

a fourth module for determining a secular momentum residual at least in part from the momentum of the spacecraft determined from the parametric model;

a fifth module for determining a momentum bias error; and a sixth module for determining the amount of momentum to be removed from the spacecraft at least in part from the measured momentum bias error and the secular momentum residual.

38. The apparatus of claim 37, wherein:

the apparatus further comprises a filter for filtering the spacecraft momentum measurements; and the fourth module comprises a difference for determining a difference between a spacecraft momentum measurement at a scheduled time for removing the momentum from the spacecraft and the estimate of the spacecraft momentum at a time one time period $t_p$ prior to the scheduled time for removing the momentum from the spacecraft.

39. The apparatus of claim 37, wherein the fifth module comprises:

a seventh module for determining the measured momentum bias at least in part from $$\frac{M_{MAX} + M_{MIN}}{2},$$

wherein $M_{MAX}$ is the maximum momentum observed during the time period $t_p$ and $M_{MIN}$ is a minimum momentum observed during the time period $t_p$; and an eighth module for determining the momentum bias error as a difference between the measured momentum bias and a commanded momentum bias.

40. The apparatus of claim 39, wherein spacecraft momentum is at least partially periodic with time period $t_p$.

41. The apparatus of claim 37, further comprising a processor, and wherein the first module, the second module, and the third module are software modules comprising instructions performable by the processor.

42. The apparatus of claim 37, further comprising a filter for filtering the plurality of spacecraft momentum measurements before fitting the spacecraft momentum measurements to the parametric model.

43. The apparatus of claim 37, wherein the periodic spacecraft momentum profile comprises a plurality of segments, each segment modeled by a set of basis functions.

44. The apparatus of claim 43, wherein the set of basis functions is selected from the group comprising:

a polynomial; and a Fourier series.

45. The apparatus of claim 44, wherein the set of basis functions is a $3^{rd}$ order polynomial, and each segment is one hour in duration.

* * * * *